US006192637B1

United States Patent
Boilen et al.

(10) Patent No.: US 6,192,637 B1
(45) Date of Patent: Feb. 27, 2001

(54) MOVEABLE STRUCTURAL REINFORCEMENT SYSTEM

(76) Inventors: Kenneth T. Boilen, 317 Via Hidalgo, Greenbrae, CA (US) 94904; Arthur B. Richardson, 1 Greenwood Way, Mill Valley, CA (US) 94941

( * ) Notice: Subject to any disclaimer, the term of this patent is extended or adjusted under 35 U.S.C. 154(b) by 0 days.

(21) Appl. No.: 09/257,875

(22) Filed: Feb. 25, 1999

(51) Int. Cl.⁷ ........................................... E04B 1/98
(52) U.S. Cl. .............. 52/167.3; 52/148; 52/149; 52/223.7; 52/291; 52/656.4; 52/656.7; 52/657; 52/693; 52/801.12; 160/133; 160/201; 160/229.1; 160/236; 49/199; 49/453
(58) Field of Search .................. 52/167.1, 167.3, 52/149, 174, 176, 146, 148, 693, 657, 573.1, 656.2, 656.4, 656.7, 801.12, 223.6, 223.7, 291; 160/201, 229, 236, 130–133; 49/197, 198, 199, 453

(56) References Cited

U.S. PATENT DOCUMENTS

| | | |
|---|---|---|
| 1,262,301 | 4/1918 | Blest . |
| 2,027,831 | 1/1936 | Kunz . |
| 2,597,786 | 5/1952 | Fontaine . |
| 3,039,525 | 6/1962 | Starr . |
| 4,441,289 | 4/1984 | Ikuo et al. . |
| 4,676,293 * | 6/1987 | Hanssen ................................ 160/201 |
| 4,723,374 * | 2/1988 | Peterson et al. ....................... 49/404 |
| 4,918,890 * | 4/1990 | Stafford ................................. 52/291 |
| 4,987,941 * | 1/1991 | Wold ..................................... 160/130 |
| 5,205,096 * | 4/1993 | Pace ..................................... 52/223.6 |
| 5,394,923 * | 3/1995 | Danziger .............................. 160/188 |
| 5,588,270 * | 12/1996 | Keating ................................. 52/291 |
| 5,749,407 * | 5/1998 | Brenner et al. ................... 160/229.1 |
| 6,062,293 * | 5/2000 | Berger, Jr. ......................... 160/229.1 |

* cited by examiner

Primary Examiner—Carl D. Friedman
Assistant Examiner—Yvonne M. Horton
(74) Attorney, Agent, or Firm—Francis Law Group (57) ABSTRACT

A moveable structural reinforcement system is described including a moveable panel, a metal frame structure connectable to the frame structure of a building opening, the frame structure including a top support member and lateral supports connected on a first end to the top support member, upper load members disposed on the top support member proximate the lateral supports, bottom load members disposed on the second ends of the lateral supports, and load transfer members disposed substantially diagonally on said panel and adapted to releasably engage the upper and lower load members. The load transfer members providing a substantially continuous load path when the panel is in a closed position and the building or structure is subjected to a lateral force.

3 Claims, 12 Drawing Sheets

MOVEABLE STRUCTURAL REINFORCEMENT SYSTEM

FIELD OF THE PRESENT INVENTION

The present invention relates generally to structural support systems. More particularly, the invention relates to a moveable structural reinforcement system for buildings and structures.

BACKGROUND OF THE INVENTION

It is well known that earthquakes impose cyclic lateral forces on buildings and structures causing them to vibrate and, in severe instances, to deform and ultimately collapse. Presently, there exists a variety of structural systems for resisting the earthquake-induced forces in the buildings (or structures). Such systems include moment-resisting frames, braced frames and shear walls. Illustrative are the systems disclosed in U.S. Pat. Nos. 4,810,920; 3,605,953 and 4,545,466.

A major drawback of the noted systems is that each is permanently affixed or adapted to a non-moveable portion of the building structure (i.e., frame). The systems are thus not designed or readily adaptable to enhance earthquake response performance (i.e., earthquake resistance) of the building while facilitating entry and egress from the building.

It is also well known that vehicle trailers (and shipping containers) experience significant bending and torsional forces during transport. Numerous systems and designs, such as monocoque frames and panels, are thus employed to enhance the structural integrity of such trailers.

The noted systems are however premised on or readily adaptable to box a like panel structures-i.e., an opening disposed at one end thereof. The systems are thus relatively ineffective to address the effects of any significant discontinuity in a panel structure (e.g., side opening), which in all likelihood, would adversely effect the torsional rigidity of the trailer structure.

It is therefore an object of the present invention to provide a moveable structural reinforcement system which enhances the structural integrity of the applied structure in addition to providing an effective closure or barrier.

It is another object of the present invention to provide a moveable structural reinforcement system for a building which is readily adaptable to the existing building structure.

It is yet another object of the present invention to provide a moveable structural reinforcement system which enhances the earthquake response performance of buildings and structures.

It is yet another object of the present invention to provide a lightweight moveable structural reinforcement system for a vehicle trailer and/or cargo container which facilitates side loading and unloading.

SUMMARY OF THE INVENTION

In accordance with the above objects and those that will be mentioned and will become apparent below, the moveable structural reinforcement system in accordance with this invention comprises a moveable panel, a metal frame structure connectable to the frame structure of a building opening, the frame structure including a top support member and lateral supports connected on a first end to the top support member, upper load members disposed on the top support member proximate the lateral supports, bottom load members disposed on the second ends of the lateral supports, and load transfer members disposed substantially diagonally on said panel and adapted to releasably engage the upper and lower load members. The load transfer members providing a substantially continuous load path when the panel is in a closed position and the building or structure is subjected to a lateral force.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE PREFERRED EMBODIMENT

The disclosed moveable structural reinforcement system substantially reduces or eliminates the disadvantages and shortcomings associated with prior art closure systems. According to the invention, the moveable reinforcement system enhances the structural integrity of the applied structure in addition to providing an effective closure or barrier. As a result, the system can be employed in a variety of applications, such as buildings (i.e., garage openings) to enhance earthquake resistance and vehicle trailers to facilitate side loading. Each of the noted applications is discussed in detail below.

It is well known that earthquakes generate ground motions which impose lateral inertia forces on buildings or structures, causing the buildings (or structures) to respond dynamically (to vibrate). The dynamic response of the building or structure depends primarily on the following four parameters: (1) the characteristics of the ground motion at the building site, (2) the mass of the building, (3) the stiffness of the building, and (4) the damping in the building.

There are a variety of engineering characterizations available for specifying the response of a building subjected to ground motions. One of these characterizations is the structure response modification factor R.

For earthquake resistance design optimization purposes, the total design base shear $V_B$ is defined as follows:

$$V_B = \frac{ZIC}{R_w}(W) \quad (1)$$

where

Z=zone factor

I=importance factor $R_w$=structural system coefficient w=weight of structure and $$C = \frac{KS}{T^{2/3}} \quad (2)$$

where

K=constant (generally 1.25)

S=site coefficient

T=period of the structure

The structure response modification factor R is the ratio of the seismic base shear (in a linearly elastic system) to the prescribed design base shear. In general, as the value of R increases, the overall ductility of the structure and its energy dissipation capacity increase. R is thus a measure of the ability of the system to absorb energy and sustain cyclic inelastic deformations without collapse.

Figure 1:
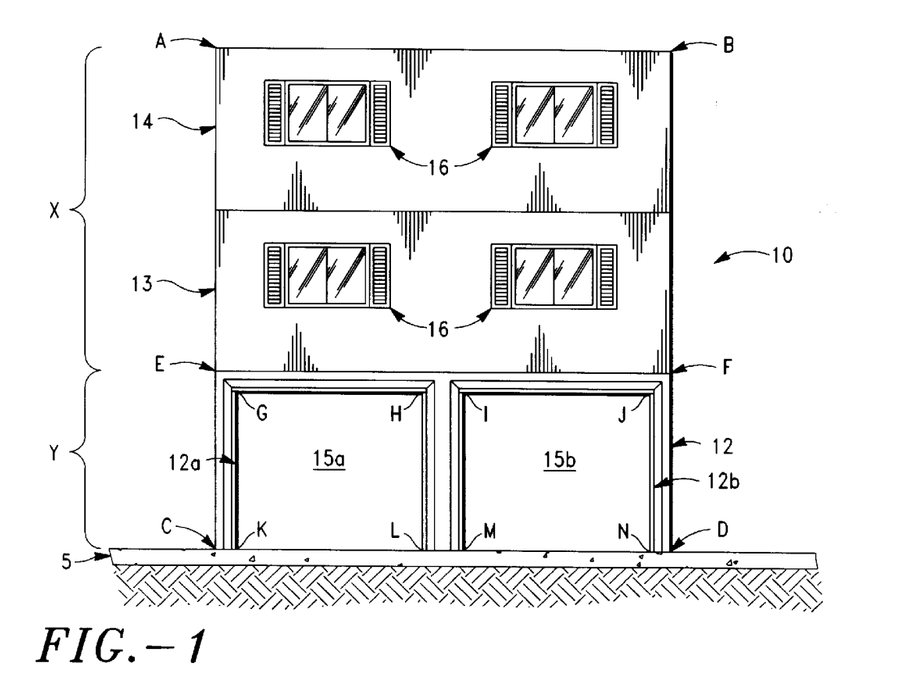
FIG. 1 is a schematic plan view of a three-story building or structure.

Referring to FIG. 1, there is shown a schematic illustration of a three-story building 10, having two floors or living areas 13, 14, a plurality of windows 16, and a garage section 12. The garage section 12 includes two openings 12a, 12b to facilitate vehicle entry and egress.

Figure 7:
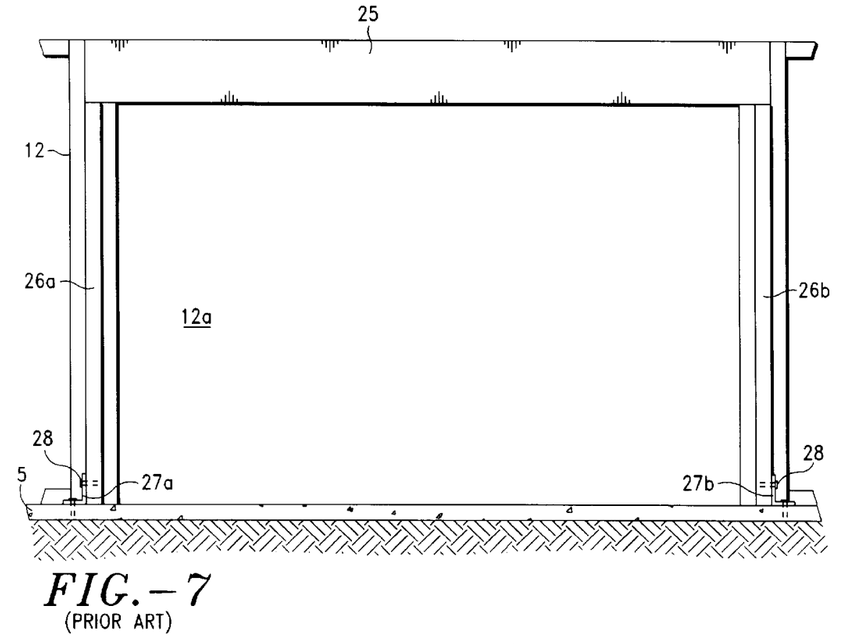
FIG. 7 is a front elevational view of a conventional garage opening frame structure.

As illustrated in FIG. 7, each opening 12a, 12b of a conventional garage includes a header 25 and a pair of vertical support members 26a, 26b attached thereto. The support members 26a, 26b and header 25 are typically constructed out of wood.

Each vertical support member 26a, 26b is further provided with a metal anchor 27a, 27b and a plurality of anchor bolts 28. According to typical construction practice, the vertical portion of each anchor 27a, 27b is secured to the side of the respective support member 26a, 26b by at least one of the anchor bolts 28 and the horizontal portion of said anchor 29b is secured to the building foundation 5 by at least one of the anchor bolts 28.

As illustrated in FIG. 1, the conventional garage 12 also includes moveable doors 15a, 15b, which are designed to provide an effective closure for the garage openings 12a, 12b. The moveable doors 15a, 15b generally comprise a solid panel or a multiple panel (i.e., "roll-up") system.

Figure 9:
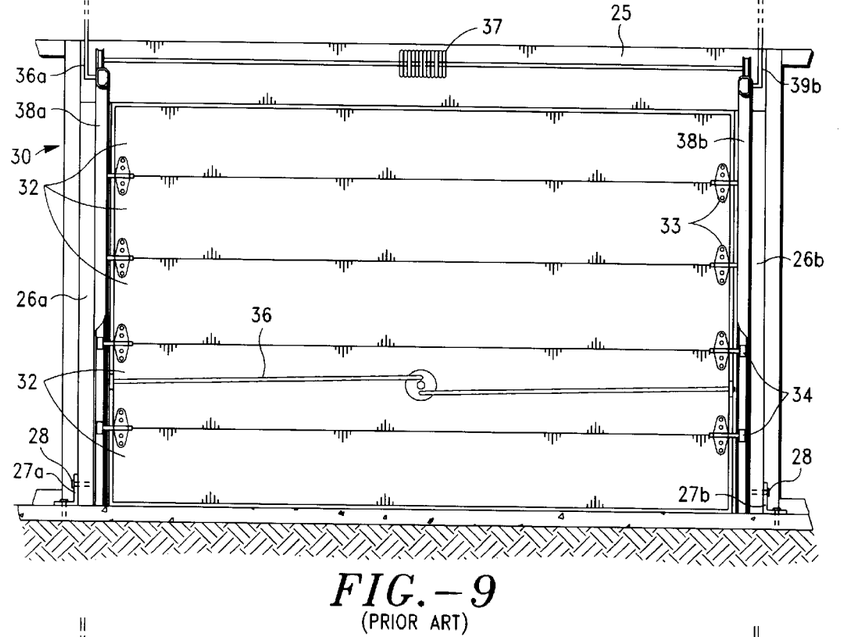
FIG. 9 is a front elevational view of a prior art garage door system.

Referring to FIG. 9, there is shown a conventional "roll-up" garage door system 30. The system 30 includes a plurality of interconnected panels 32, a plurality of panel hinges 33 adapted to hingedly connect mating pairs of panels 32, a plurality of guide wheels 34, a locking system 36, a tensioning spring mechanism 37, and a pair of guide rails 38a, 38b. According to conventional construction practice, each guide rail 38a, 38b is secured via bolts to a respective support post (26a, 26b) and the ceiling structure (not shown) via support brackets 39a, 39b.

Figure 11:
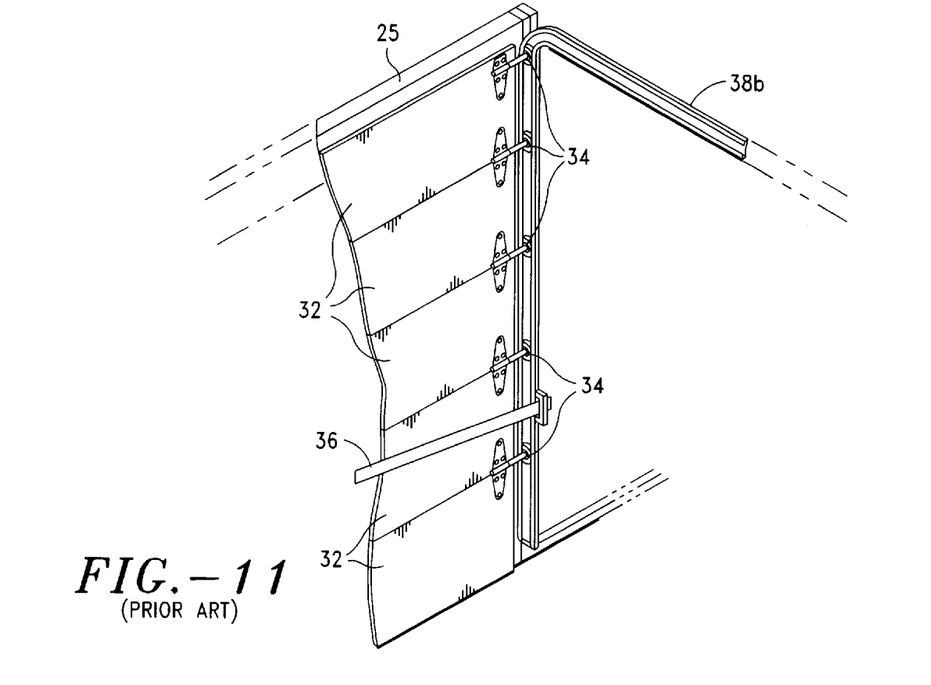
FIGS. 11 and 12 are partial perspective views of the prior art garage door system shown in FIG. 9.
Figure 12:
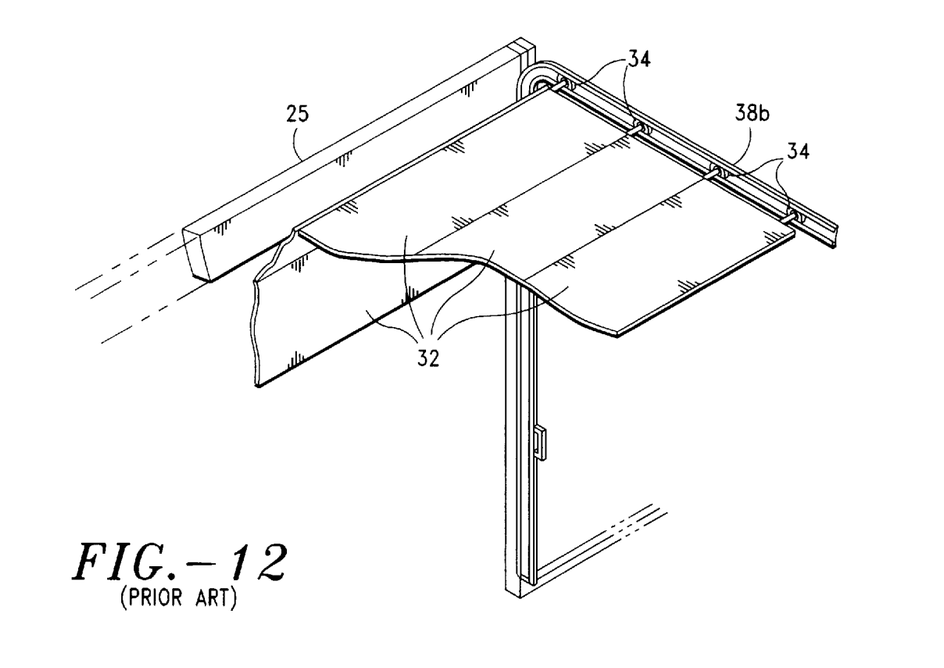

As illustrated in FIG. 11, the guide wheels 34 are disposed on each end of the panels 32 and are adapted to rotatably engage the guide rails 38a, 38b. During raising and lowering of the interconnected panels 32, the guide wheels 34 are positioned by the rails 38a, 38b to facilitate a smooth transition of the panels 32 (see FIG. 12).

The noted system 30, when closed, provides an effective closure of a garage opening. However, as will be appreciated by one skilled in the art, the conventional garage door system 30 discussed above is not a structural member and thus provides little, if any, supplemental damping or stiffness to the building 10. Accordingly, the relative damping and stiffness of the building 10 illustrated in FIG. 1 will be dramatically different for the portion of the building defined by points A, B, E and F, denoted X, compared to the garage portion of the building defined by points E, F, C and D (with or without the garage doors 15a, 15b in closed positions), denoted Y.

Indeed, assuming building portion Y is a separate structure, the response modification factor R would be approximately 5.6. Structure Y would also have a seismic force amplification factor $\Omega_0$ of approx. 2.2.

In contrast, building portion X would have a response modification factor R of approx. 6.5. Structure X would also have a seismic force amplification factor $\Omega_0$ of approx. 2.8.

It can thus be seen that R for section X ($R_x$) is approx. 14% greater than R for structure Y ($R_y$). Similarly, $\Omega_0$ for structure X ($\Omega_0$ ') is approx. 21% greater than $\Omega_0$ for structure Y ($\Omega_0$ ").

Figure 2:
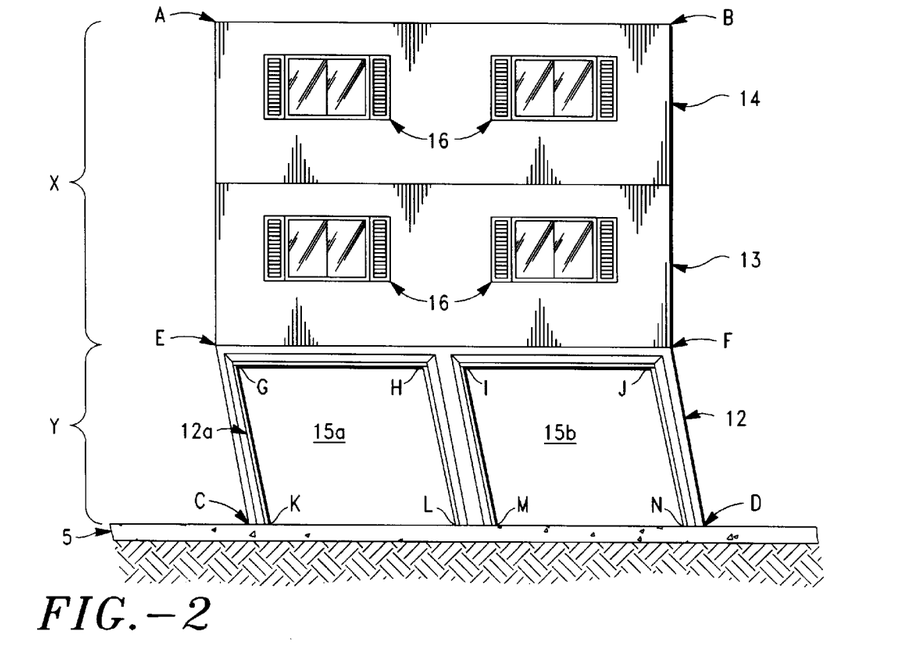
FIG. 2 is a schematic plan view of the building shown in FIG. 1, illustrating the imminent collapse of the building proximate the garage portion of the building.
Figure 3:
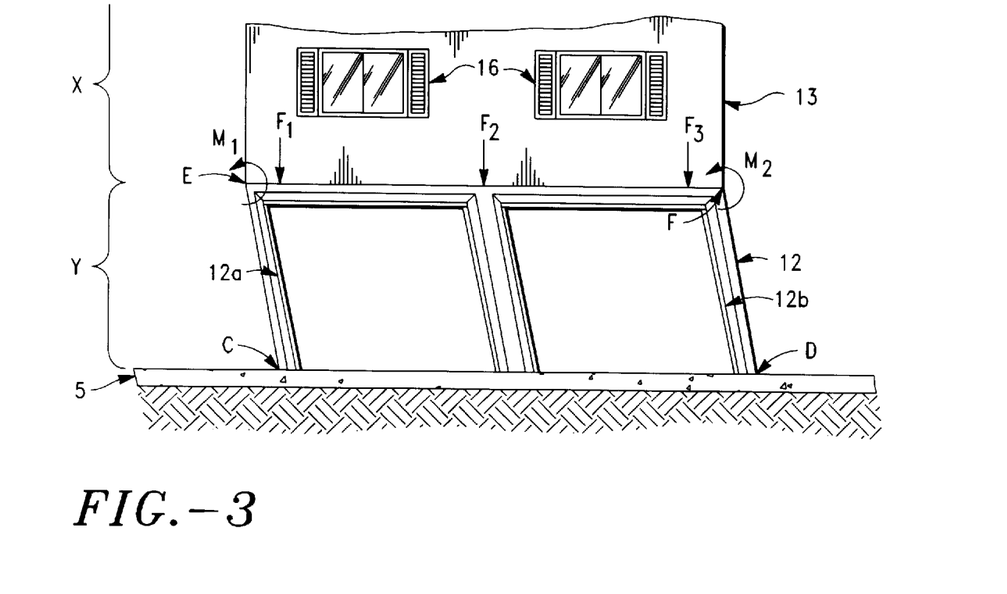
FIG. 3 is a schematic plan view of the garage structure shown in FIG. 2, illustrating the applied forces to the structure.

Thus, during an earthquake of any significant magnitude, structure Y can, and in most instance will, collapse about points E and F prior to any occurrence of significant structural damage to structure X (see FIG. 2). The failure about points E and F is further enhanced by virtue of the downward force or load (denoted by arrows $F_1$, $F_2$ and $F_3$) exerted by structure X on structure Y. As illustrated in FIG. 3, upon any significant lateral movement about points E, F, C, and D, the downward force exerted by structure X would dramatically increase the resultant moments $M_1$ and $M_2$ about points E and F, respectively.

Figure 4:
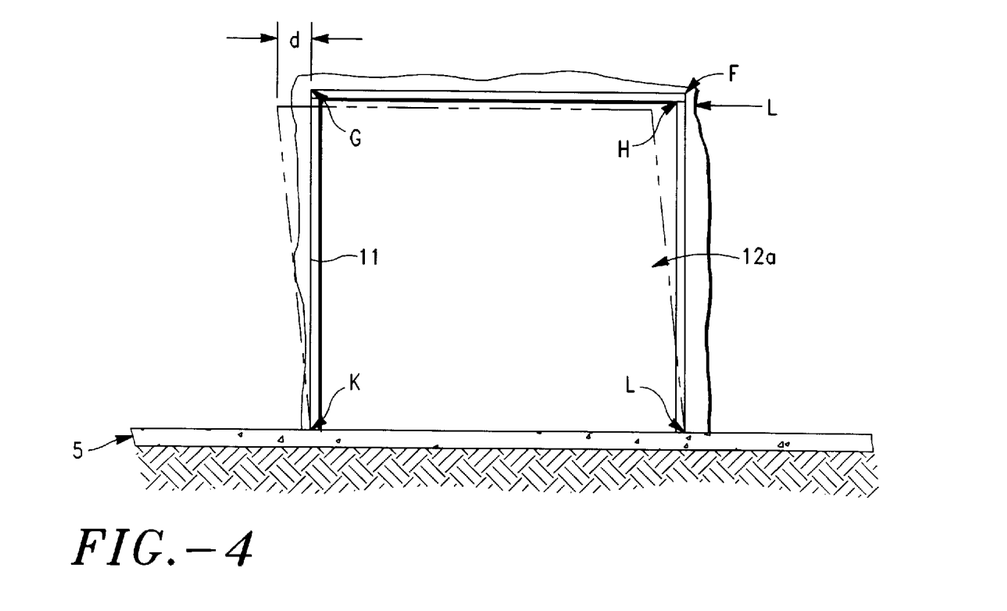
FIG. 4 is a schematic plan view of a garage opening, illustrating an applied lateral load and resultant deflection in the garage opening.
Figure 5:
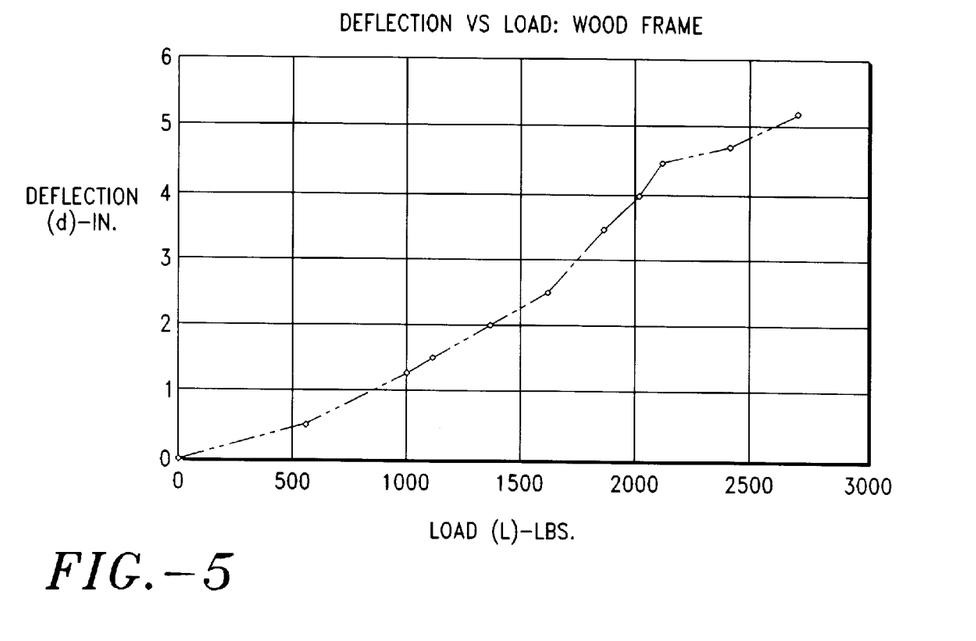
FIG. 5 is a deflection versus load curve for a garage opening having a wood frame.
Figure 6:
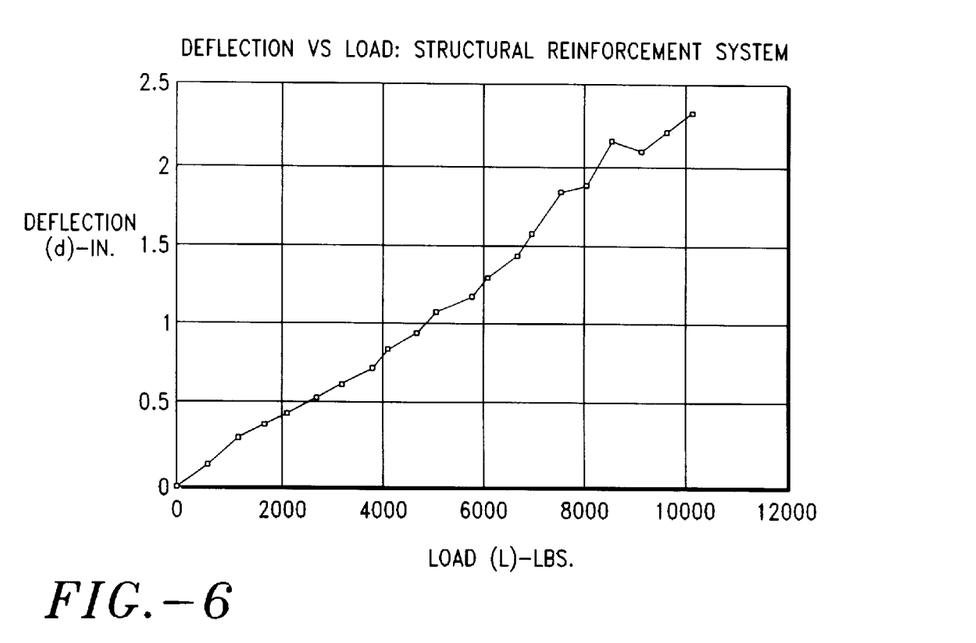
FIG. 6 is a deflection versus load curve for a garage opening having a metal frame.

Referring now to FIGS. 5 and 6, there are shown applied load versus deflection curves for structure Y, which further demonstrate the structural integrity and, hence, earthquake resistance characteristics of structure Y. Referring to FIG. 4, lateral loads (denoted by Arrow L) were applied to garage opening 12a proximate point F with the resultant deflection measured at point G. Load versus deflection curves were thus generated for a conventional garage opening 12a (absent door 15a) having both a wood structure (FIG. 5), such as that illustrated in FIG. 7 (26a, 26b, 25), and a wood structure with the reinforcement system of the invention.

As can be seen in FIG. 5, for a load of approximately 2,500 lbs., the resultant deflection in a typical wood structure (25, 26a, 26b) was nearly 5.0 in. For a load of approximately 10,000 lbs. the resultant deflection in the structure with the reinforcement system, was only approximately 2.3 in. (see FIG. 6).

Since the earthquake characteristics of the building defined by structure X and Y will be dependent, in significant part, on the characteristics of structure Y—the weakest link—improvements in the damping and stiffness of structure Y (i.e., supplemental damping and/or stiffness) will significantly enhance the earthquake resistance characteristics of the entire building. Such improvements have been achieved by virtue of the present invention.

Figure 8:
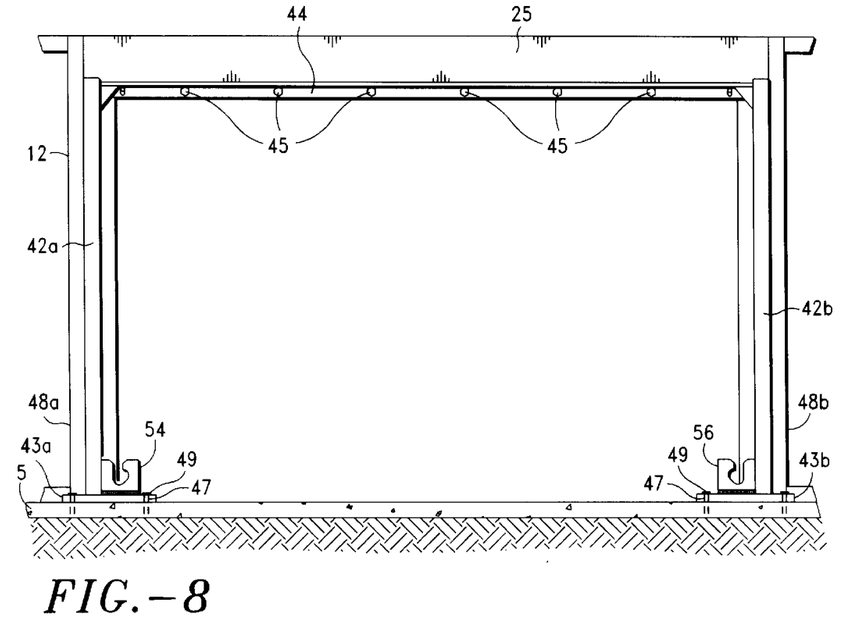
FIG. 8 is a front elevational view of a metal frame structure of a first embodiment of the invention.
Figure 10:
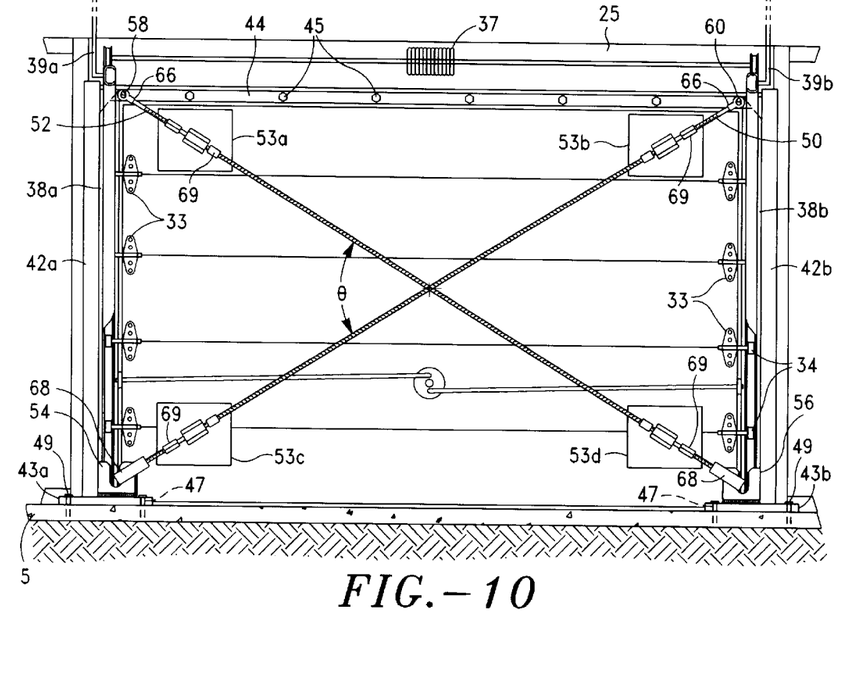
FIG. 10 is a front elevational view of a first embodiment of the invention.

Referring now to FIG. 10, there is shown a first embodiment of the structural reinforcement system of the invention in the form of a "garage door system" 40. The garage door system 40 includes the noted metal frame structure comprising side reinforcing members 42a, 42b and a top reinforcing member 44. According to the invention, the top reinforcing member 44 is attached to the header 25 by conventional means. In a preferred embodiment, the top reinforcing member 44 is bolted to the header via a plurality of conventional bolts 45. is As illustrated in FIG. 8, the side reinforcing members 42a, 42b are secured to the top reinforcing member 44 by conventional means. In a preferred embodiment, one end of each side reinforcing member 42a, 42b is welded to opposing ends of the top reinforcing member 44.

Figure 8A:
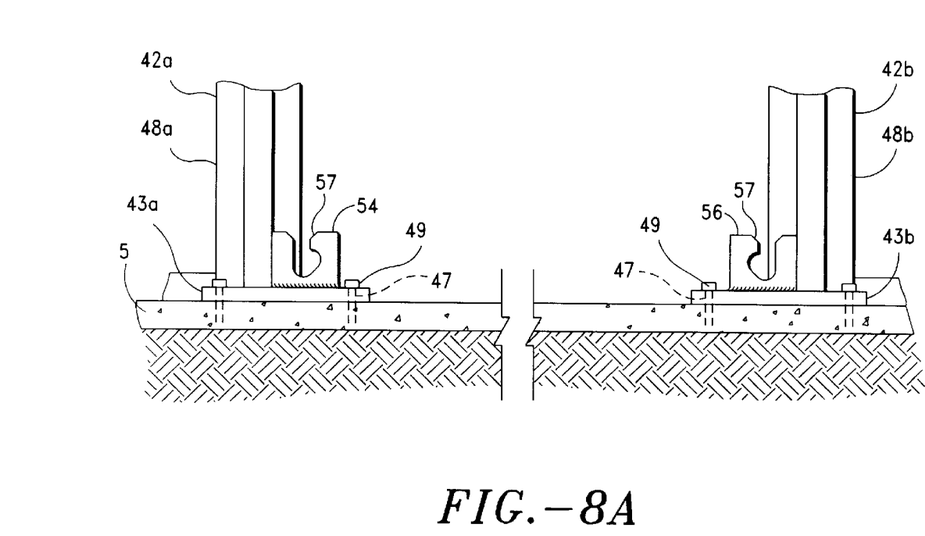
FIG. 8A is a partial plan view of the metal frame structure shown in FIG. 8, illustrating the load collectors according to the invention.
Figure 13:
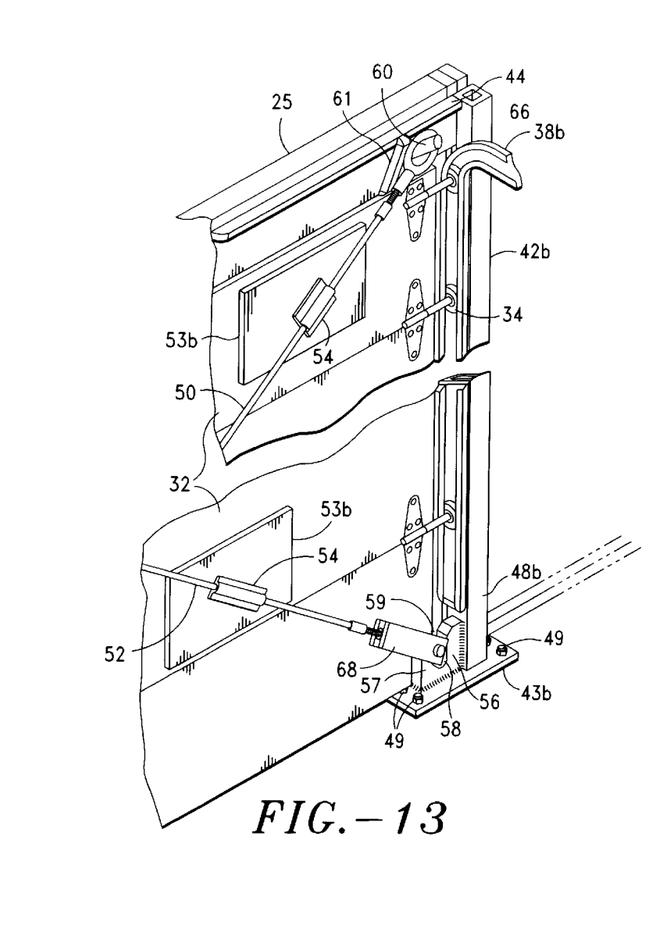
FIG. 13 is a partial perspective view of the first embodiment of the invention shown in FIG. 10 in which the movable structural reinforcement system is in a closed, load-bearing position.

Referring now to FIGS. 8A and 13, each side-reinforcing member 42a, 42b is provided with a substantially horizontal anchor plate 43a, 43b which is secured to each member 42a, 42b proximate the anchor ends 48a, 48b thereof. Each anchor plate 43a, 43b includes a plurality of engagement holes 47 adapted to receive and position the reinforcement bolts 49, which secure the side reinforcing members 42a, 42b to the foundation 5.

Figure 15:
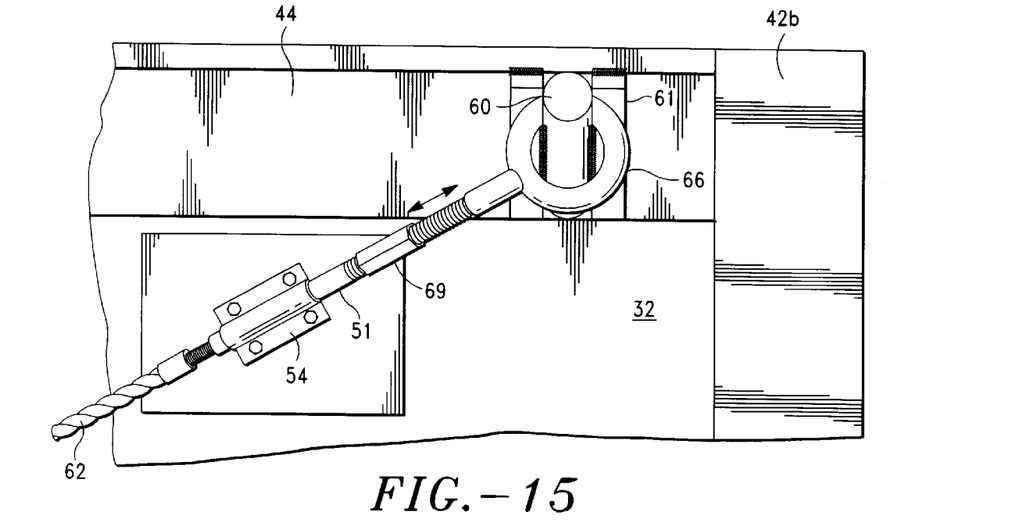
FIG. 15 is a partial elevational view of the first embodiment of the invention shown in FIG. 10, illustrating the engagement of a header pin and load transfer member ring according to the invention.
Figure 17:
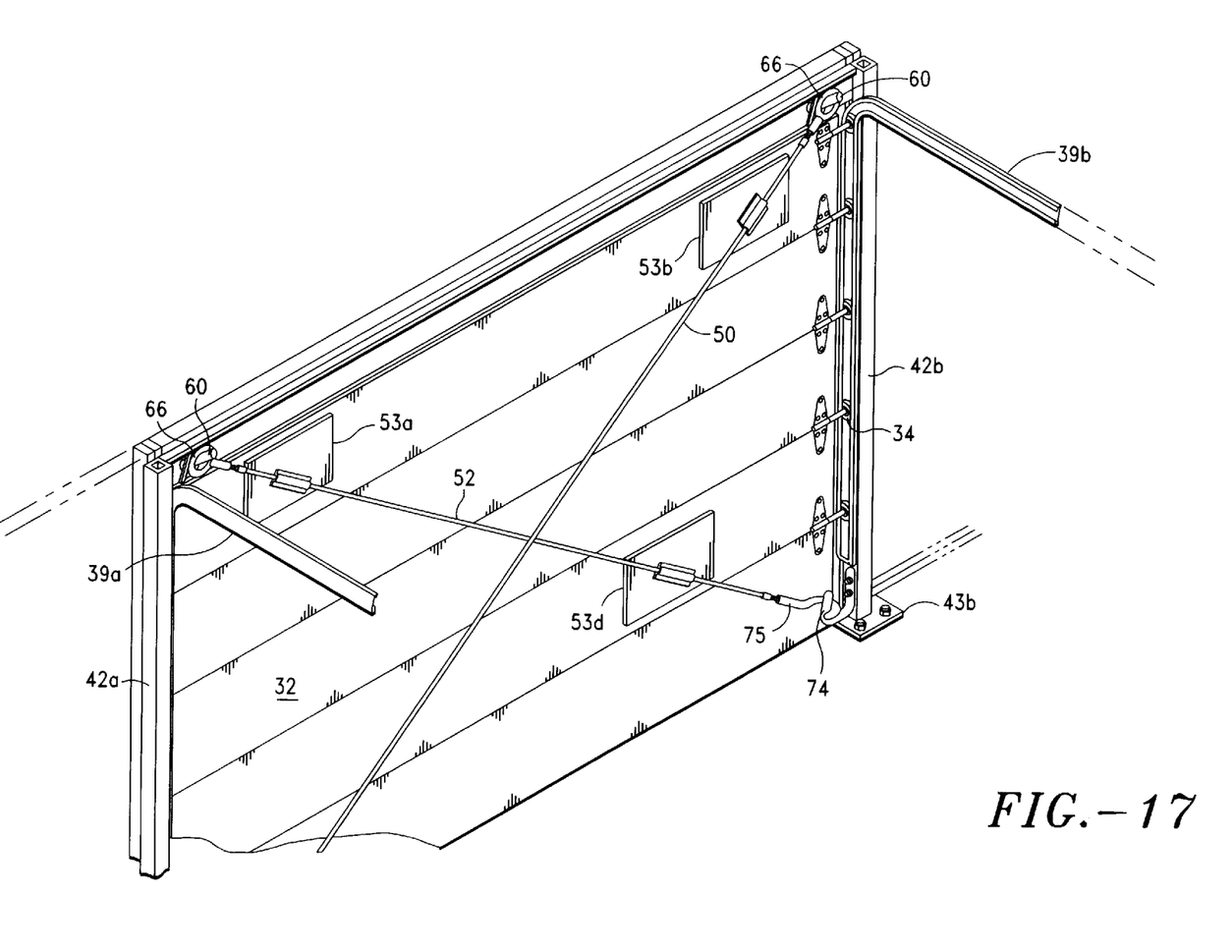
FIG. 17 is a partial perspective view of the first embodiment of the invention, illustrating an additional embodiment of a load collector according to the invention.

According to the invention, the garage door system 40 further includes a plurality of load transfer members 50, 52, transfer member guides 53a–53d, load collectors 54, 56, and header pins 58, 60. As illustrated in FIGS. 15 and 17, the header pins 58, 60 are secured by conventional means to the top reinforcing member 44 approximately 6 ins. to 10 ins. from each respective side-reinforcing member 42a, 42b. In a preferred embodiment, angled mounting plates 61 are provided to facilitate engagement (i.e. welding) of the pins 58, 60 to the top reinforcing member 44.

Figure 14:
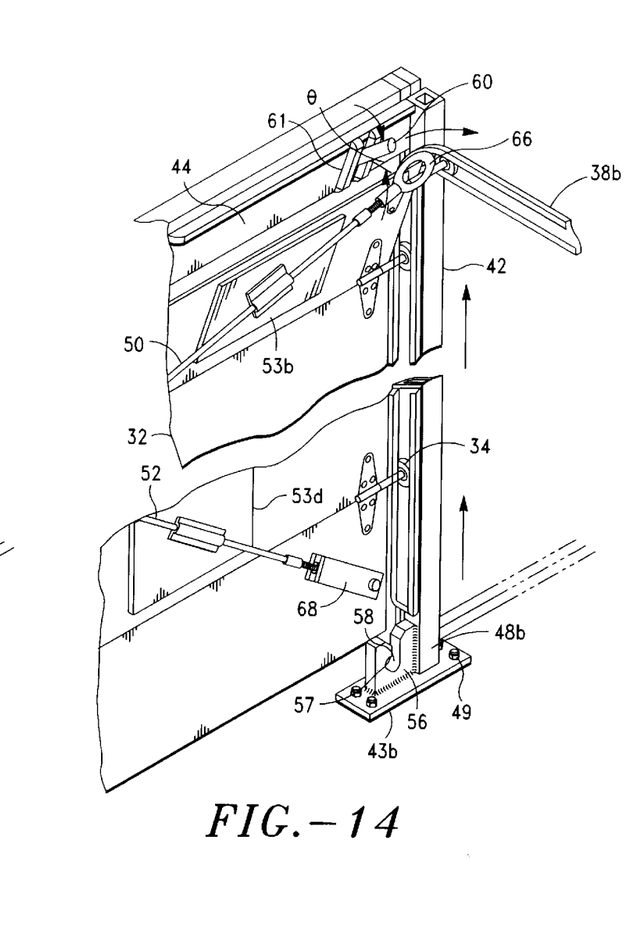
FIG. 14 is a partial perspective view of the first embodiment of the invention shown in FIG. 10, illustrating the release of the moveable structural support system according to the invention.

As illustrated in FIGS. 13 and 14, the pins 58, 60 are oriented on substantially parallel planes with each pin 58, 60 projected upwardly at an angle θ in the range of 30° to 40°, preferably, approximately 33° to 37°. Applicants have found that the noted pin angle θ facilitates engagement and disengagement of the load transfer members 50, 52 during opening and closing of the integral interconnected panels 32 while providing secure engagement of the members 50, 52 during external loading (see FIG. 14).

Figure 16:
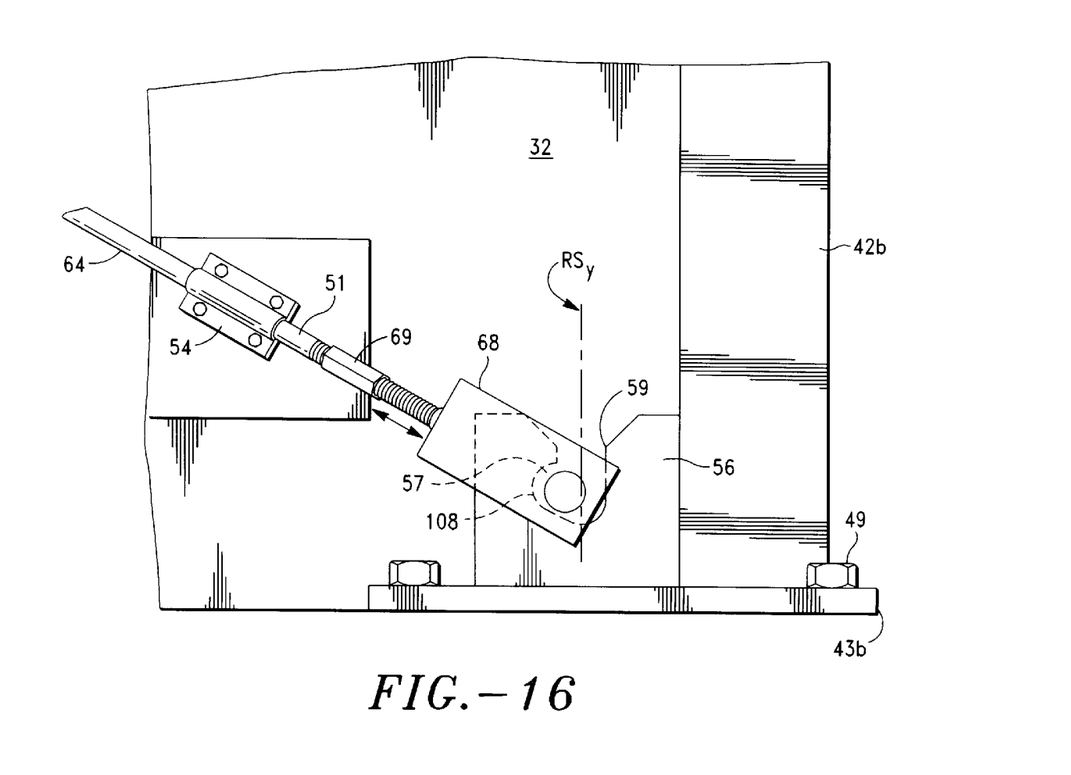
FIG. 16 is a partial elevational view of the first embodiment of the invention shown in FIG. 10, illustrating the engagement of a load collector and load transfer member hook according to the invention.

Referring now to FIGS. 8A and 16, each of the load collectors 54, 56 of the invention are secured to a respective anchor plate 43a, 43b and side reinforcing member 42a, 42b proximate the anchor ends 48a, 48b thereof. In a preferred embodiment, each load collector 54, 56 is welded to a respective side-reinforcing member 42a, 42b and anchor plate 43a, 43b (see FIG. 8A).

According to the invention, each load connector 54, 56 comprises a substantially planar plate with an internal engagement portion 57 adapted to receive and secure one end of respective load transfer member 50, 52. In a preferred embodiment, the engagement portion 57 comprises a receiving slot 59 positioned on a substantially vertical plane (designated RSY) and an inwardly directed engagement recess 58 disposed proximate the end of the receiving slot 59 (see FIG. 16).

In an additional embodiment, illustrated in FIG. 17, each load collector comprises a substantially hook-shaped structure 74. In the noted embodiment, a hook 75 is further provided on the lower ends of the load transfer members 50, 52 which is adapted to engage the structure 74.

As indicated above, the garage door system 40 includes a plurality of load transfer members, preferably two members 50, 52. According to the invention, the load transfer members 50, 52 are disposed on the interior side of the interconnected panels 32 (see FIG. 10). In a preferred embodiment, the members 50, 52 cross proximate the center of the interconnected panels (i.e., door structure) at an angle θ in the range of 36° to 41° for a single car system (i.e. approx. 8 ft. entry) and 18° to 23° for a two-car system.

As will be appreciate by one having ordinary skill in the art, the load transfer members 50, 52 may comprise a variety of shapes and materials, such as the wire rope or cable 62 and solid metal rod 64 shown in FIGS. 15 and 16, respectively; provided, however, that the members meet or surpass the strength requirements of the system 30. In a preferred embodiment, each load transfer member 50, 52 comprises a wire rope having a minimum nominal strength of 17,500 lbs.

Referring to FIGS. 15 and 16, each load transfer member 50, 52 is provided with a pin engagement ring 66 on one end adapted to slideably engage a respective header pin 58, 60 and a load collector engagement member 68 disposed on the opposite end of the member which is adapted to slideably engage a respective load collector 54, 56.

Figure 10A:
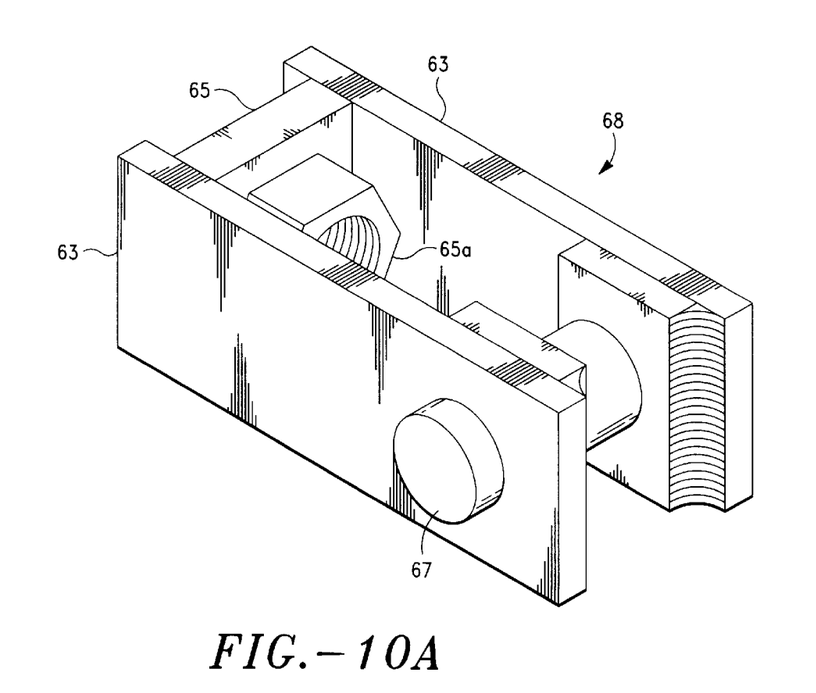
FIG. 10A is a perspective view of a load collector engagement member according to the invention.

Referring to FIG. 10A, the load collector engagement member 68 preferably comprises a substantially box shaped structure having a pair of substantially parallel opposing side plates 63, a bottom plate 65, having a nut 65a attached thereto adapted to engage the adjusters 69 (discussed below), and an engagement rod 67 disposed proximate the top of the box-structure adapted to slideably engage the load collector engagement portion 57.

Referring to FIGS. 15 and 16, each end of the load transfer members 50, 52 is further provided with threaded engagement member adjusters 69, which are adapted to connect each pin engagement ring 66 and load collector engagement member 68 to a respective load transfer member 50, 52 on each end thereof. The threaded adjusters 69 also facilitate adjustments in the operational length of each load transfer member 50, 52.

Referring to FIG. 10, the load transfer members 50, 52 are maintained in the above-discussed optimum position via the load transfer member guides 53a–53d. According to the invention, each guide 53a–53d is secured to the interior side of a panel 32 proximate the ends thereof. In a preferred embodiment, each guide 53a–53d includes a substantially cylindrical cable lumen 54 adapted to receive and slideably position the load transfer members 50, 52 (see FIGS. 15 and 16).

Figure 18:
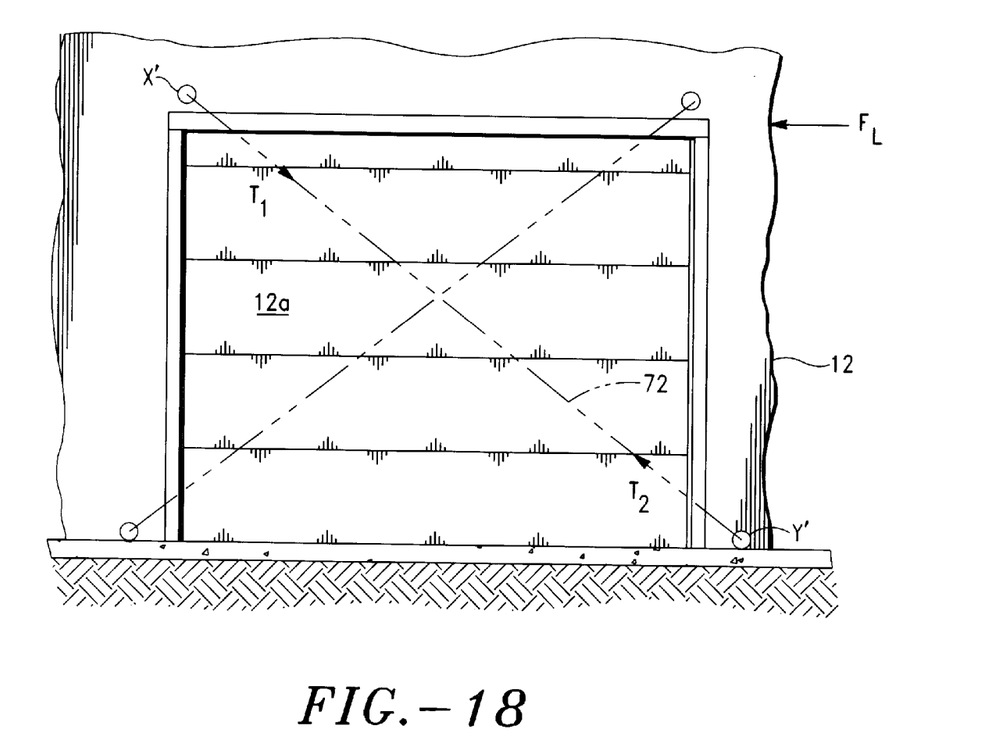
FIG. 18 is a schematic plan view of a garage opening, illustrating the load transfer link between two points of a garage structure that experience lateral forces according to the invention.
Figure 19:
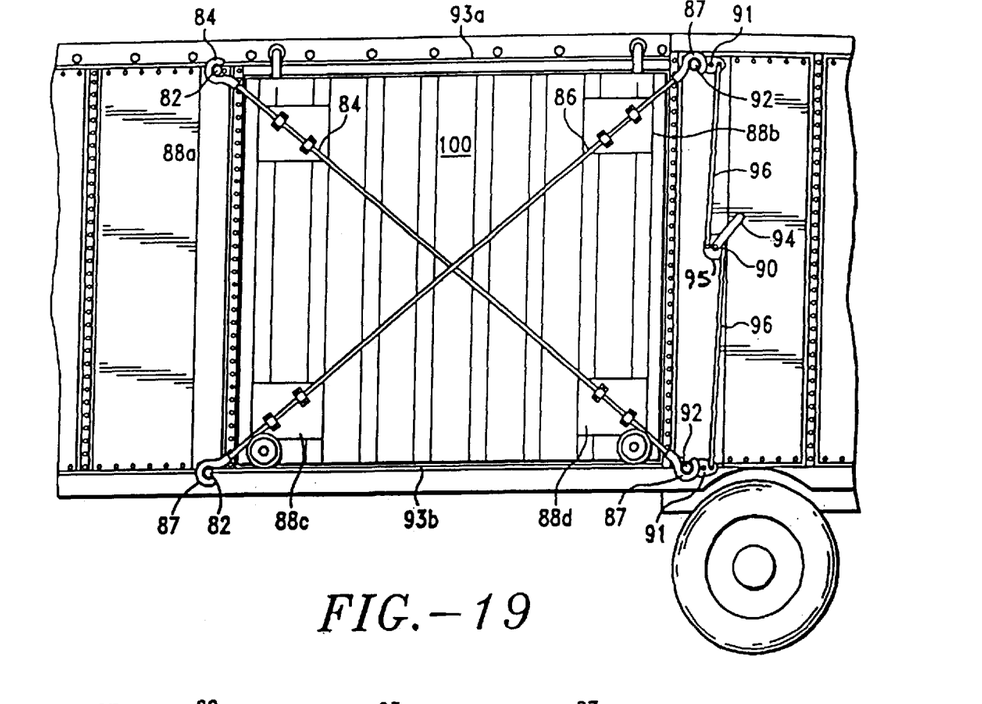
FIG. 19 is a partial elevational view of a trailer structure, illustrating a second embodiment of the invention.
Figure 20:
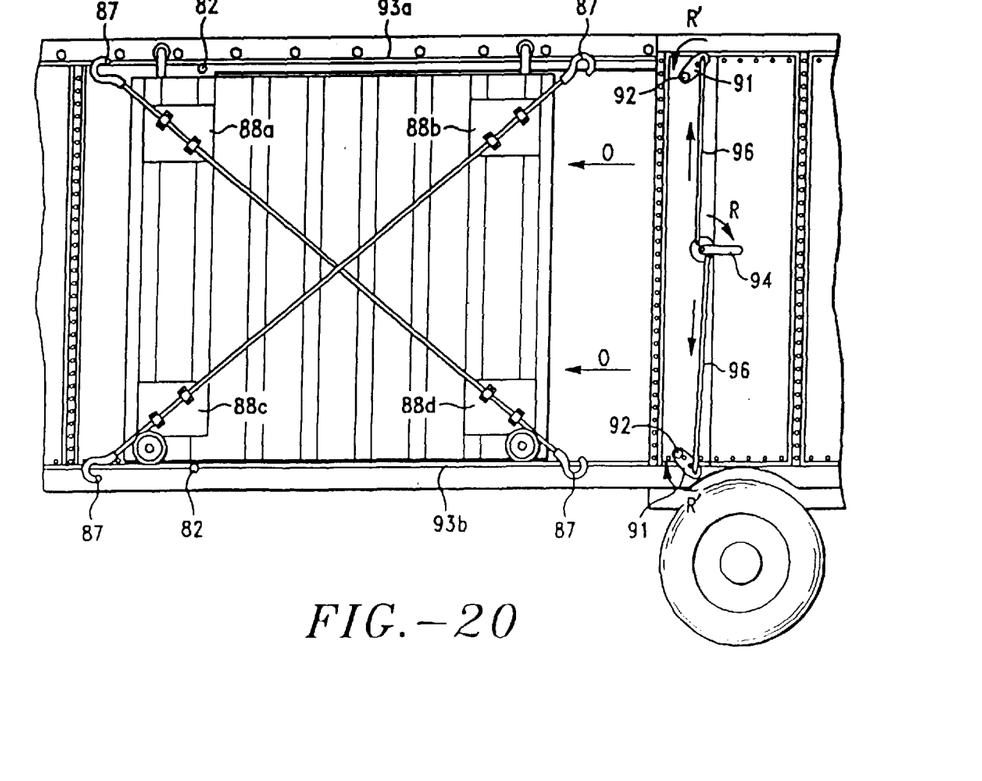
FIG. 20 is a partial elevational view of the second embodiment of the invention shown in FIG. 19, illustrating the disengagement of the moveable structural reinforcement system according to the invention.

Applicants have found that the unique garage door system 30 described above, when in the closed position, significantly enhances the structural integrity and, hence, earthquake resistance of a garage structure by effectively transferring the applied loads proximate points G, H, I and J (see FIG. 1) to the supporting foundation 5 (i.e., continuous load path). As illustrated in FIG. 18, during the application of a lateral force $F_L$ to the garage structure 12, the load transfer member shown in phantom and denoted 72 would exhibit tensile loading (denoted by Arrows $T_1$ and $T_2$). The load at point x' would also be transferred via member 72 to the foundation 5 at point y' (via a respective load collector 54, 56).

As a result of the unique load bearing and transfer characteristics of the garage system 30, the supplemental stiffness added to a building or structure has been found to be greater than 30% of the inherent stiffness of the building. Applicants have further found that the supplemental damping added to a building employing the noted system 30 to be greater than 20% of the inherent damping in the building.

Applicants have additionally found that buildings employing the noted system 30 exhibited an increase of greater than 18% in the response modification factor R and an increase of greater than 15% in the seismic force over strength factor $\Omega_0$. As will be appreciated by one having ordinary skill in the art, the noted modifications in the seismic factors reflect significant improvements in the earthquake resistance of the buildings and/or structures.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. A moveable structural reinforcement system for a building or structure having a reinforced floor and an opening for access therein, said opening including a fixed frame having first and second side portions and a header portion, comprising:

a flexible panel, having an interior and exterior surface said panel including guide means disposed on opposite sides of said panel;

a pair of guide rails connected to said opening frame, said guide rails being positioned on substantially parallel planes and adapted to slideably receive said panel guide means;

a metal frame structure, said metal frame structure including substantially parallel first and second lateral support members and a top support member connected to a first and of said first and second lateral support members, said first and second lateral support members connectable to said metal frame structure first and second side portions, said first and second lateral support members further connectable to said reinforced floor proximate the second ends thereof;

first and second upper load members, said first upper load member being disposed on said top support member proximate said first end of said first lateral support member, said second upper load member being disposed on said top support member proximate said first end of said second lateral support member;

first and second lower load members, said first lower load member being disposed on said first lateral support member proximate the second end thereof, said second lower load member being disposed on said second lateral support member proximate the second end thereof; and first and second load transfer members, said load transfer members being disposed substantially diagonally on the interior surface of said flexible panel, said first load transfer member being releasably secured to said first upper load member and said second lower load member, said second load transfer member being releasably secured to said second upper load member and said first lower load member, said load transfer member providing a substantially continuous load path when said panel is in a closed position and said structure is subjected to a lateral force.

2. A structural reinforcement system of claim 1, wherein said first and second load transfer members include a wire rope body portion, said body portion having a minimum nominal strength of 17,500 lbs.

3. A structural reinforcement system of claim 1, wherein each of said first and second upper load members comprise a pin.

* * * * *